United States Patent
Gocha et al.

(10) Patent No.: US 11,698,157 B2
(45) Date of Patent: Jul. 11, 2023

(54) QUICK CONNECTOR LATCH VERIFICATION UTILIZING A SCANNABLE CODE

(71) Applicant: Cooper-Standard Automotive Inc., Northville, MI (US)

(72) Inventors: Kenneth Gocha, Flint, MI (US); Brian James Cardwell, Ypsilanti, MI (US); Angela Greiner, Plymouth, MI (US)

(73) Assignee: Cooper-Standard Automotive Inc., Northville, MI (US)

(*) Notice: Subject to any disclaimer, the term of this patent is extended or adjusted under 35 U.S.C. 154(b) by 75 days.

(21) Appl. No.: 17/347,880

(22) Filed: Jun. 15, 2021

(65) Prior Publication Data

US 2022/0026002 A1 Jan. 27, 2022

Related U.S. Application Data

(60) Provisional application No. 63/056,243, filed on Jul. 24, 2020.

(51) Int. Cl.
*F16L 37/12* (2006.01)

(52) U.S. Cl.
CPC ....... *F16L 37/1225* (2013.01); *F16L 2201/10* (2013.01)

(58) Field of Classification Search
CPC ... F16L 2201/10; F16L 2201/60; F16L 37/12; F16L 37/144; F16L 37/1225
See application file for complete search history.

(56) References Cited

U.S. PATENT DOCUMENTS

| | | |
|---|---|---|
| 2003/0052484 A1 | 3/2003 | Rautureau |
| 2019/0264851 A1* | 8/2019 | Noguchi ............... F16L 37/144 |
| 2019/0390808 A1 | 12/2019 | Trotter et al. |
| 2020/0292116 A1* | 9/2020 | Nagaya ............... F16L 37/144 |
| 2020/0309298 A1* | 10/2020 | Kuhn ............... F16L 37/0885 |
| 2020/0355308 A1 | 11/2020 | Hunt et al. |
| 2021/0285581 A1* | 9/2021 | Rydin ............... F16L 37/144 |
| 2021/0396336 A1* | 12/2021 | Schröter ............. F16L 37/0841 |

(Continued)

FOREIGN PATENT DOCUMENTS

| | | |
|---|---|---|
| CN | 104295837 A | 1/2015 |
| DE | 102018219440 A1 | 5/2020 |
| JP | 4759421 B2 | 8/2011 |

OTHER PUBLICATIONS

European Search Report for EP 21186371.7 dated Dec. 14, 2021.

*Primary Examiner* — David Bochna
(74) *Attorney, Agent, or Firm* — Paschall & Associates, LLC; James C. Paschall

(57) ABSTRACT

This disclosure relates to a quick connector adapted to display a code that verifies that a latch member is engaged to retain an installed pipe to the quick connector. The quick connector comprises a connector body having a receiving portion surrounding an internal passage, the internal passage arranged to receive the pipe therein. A latch member retained on the receiving portion is arranged to be movable between a pipe insertion position and a latched position. In the pipe insertion position, the latch member allows the pipe to be inserted into the internal passage. A code readable by a scanning device becomes readable when the latch member is moved to the latched position verifying that the pipe is installed and latched in the connector body.

19 Claims, 3 Drawing Sheets

(56) References Cited

U.S. PATENT DOCUMENTS

| | | | |
|---|---|---|---|
| 2022/0003347 A1* | 1/2022 | Barthel | F16L 37/1225 |
| 2022/0163153 A1* | 5/2022 | Gauthier | F16L 37/144 |
| 2022/0243850 A1* | 8/2022 | Teasley | F16L 37/142 |
| 2022/0299143 A1* | 9/2022 | Gabbey | F16L 37/144 |
| 2022/0364667 A1* | 11/2022 | Jensen | F16L 37/127 |

* cited by examiner

QUICK CONNECTOR LATCH VERIFICATION UTILIZING A SCANNABLE CODE

REFERENCE TO RELATED APPLICATIONS

This application claims priority under 35 U.S.C. § 119(e) to U.S. Provisional Patent Application No. 63/056,243 filed on Jul. 24, 2020. This provisional application is hereby incorporated by reference in its entirety.

TECHNICAL FIELD

This disclosure is generally directed to quick connectors. More specifically, it relates to a quick connector that displays a scannable code for verifying that a proper latching connection has been made to a tube.

BACKGROUND

Quick connectors are connector assemblies that allow for convenient, quick, fluid-tight connections between two or more pipes, tubes, or similar components. Quick connectors are commonly used in the automotive industry to connect tubing used in engine cooling line connections, fuel and brake connections, vapor connections or, more recently, in cooling circuits used to cool batteries of electric or hybrid vehicles. Quick connectors typically include a female connector for receiving a male connector, or a male connector for receiving a female connector. In operation, when fully disposed within the female connector, the male connector is locked in position allowing for leak-free fluid communication between a first tube in fluid communication with the female connector and a second tube in fluid communication with the male connector. Unfortunately, many conventional quick connectors suffer from numerous drawbacks associated with locking together the components that are not fully connected or not locked in position, resulting in failed connections and leaks.

It would be desirable to provide a scannable image for verifying that the quick connector components are locked in position.

It would be further desirable to provide a machine-readable method for ascertaining that the quick connector has been properly assembled.

SUMMARY

This disclosure relates to a quick connector adapted to display a code that verifies that a latch member is fully engaged to retain an installed pipe to the quick connector. The quick connector comprises a connector body having a receiving portion surrounding an internal passage, the internal passage arranged to receive the pipe therein. A latch member retained on the receiving portion is arranged to be movable between a pipe insertion position and a latched position. In the pipe insertion position the latch member allows the pipe to be inserted into the internal passage. A code readable by a scanning device becomes readable when the latch member is moved to the latched position verifying that the pipe is installed and latched in the connector body.

In a first embodiment, the connector body includes at least one flange surrounding the internal passage. The latch member includes at least a first leg retained on the receiving portion adjacent the flange. At least a first partial code is applied to the first leg and at least one additional partial code applied to the flange. When the latch member is moved to the latched position the first partial code becomes aligned with the at least one additional partial code, forming a readable code that can be read by a scanning device.

In a second embodiment the connector body includes at least one flange surrounding the internal passage. The latch member includes at least a first leg retained on the receiving portion adjacent the flange. The first leg includes a cover member extending from the first leg over the flange. A code applied to the flange is hidden by the cover in the pipe insertion position. When the latch member is moved to the latched position the cover member uncovers the code allowing the code to be read by a scanning device.

In a third embodiment a method for verifying a latched connection of a connector is disclosed. The method comprising, providing a connector body having a receiving portion surrounding an internal passage and a latch member retained on the receiving portion, movable between a pipe insertion position and a latched position. The method further includes moving the latch member to the latched position wherein a code becomes readable verifying that the pipe is installed and latched in the connector body.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

In accordance to the present embodiment, there is provided a quick connector of the type commonly used in the automotive industry to connect tubing used in engine cooling line connections, fuel and brake connections, vapor connections or the like. The quick connector includes a connector body and a slidable latch mechanism. The connector body includes an internal passage centrally located in the connector body adapted so that a pipe can be inserted into the passage. The latch mechanism is located on the connector body and is slidable from a pipe insertion position that facilitates the insertion of the pipe into the connector body internal passage, to a latch position that captures and retains the pipe within the connector body.

In a first embodiment, the slidable latch mechanism further includes guide and latching legs each having a partial portion of a scannable code printed on an external surface of a guide leg and latching leg. Another partial portion of the scannable code is printed on a surface of a flange molded on the connector body. The partial portions of the scannable codes can be barcodes. QR codes or any other code that can be scannable and read by a machine vision device, a handheld scanner or other code scanning device. When the slidable latch mechanism is in the pipe insertion position the partial portions of scannable codes are mis-aligned and are unreadable by the scanning device. Moving the latch mechanism into the latching position so as to capture the pipe, aligns the partial portions of scannable codes to build a complete scannable code that can be read and recorded by a user using the handheld scanner, thereby indicating a positive latch connection between the pipe and the connector body. Alternately, the complete scannable code can be scanned by a code reader during an assembly or manufacturing process.

In a second embodiment, the latch mechanism includes a cover member that when the latching member is in the tube insertion position covers a scannable code, such as a barcode. QR code or other machine-readable code that is printed or etched on an outer flange of the connector body. Sliding the latching mechanism to the latching position captures the pipe installed in the connector body and uncovers the scannable code. The scannable code can be recorded by a user to indicate a positive tube connection or scanned by a code reader during an assembly or manufacturing process.

Figure 1:
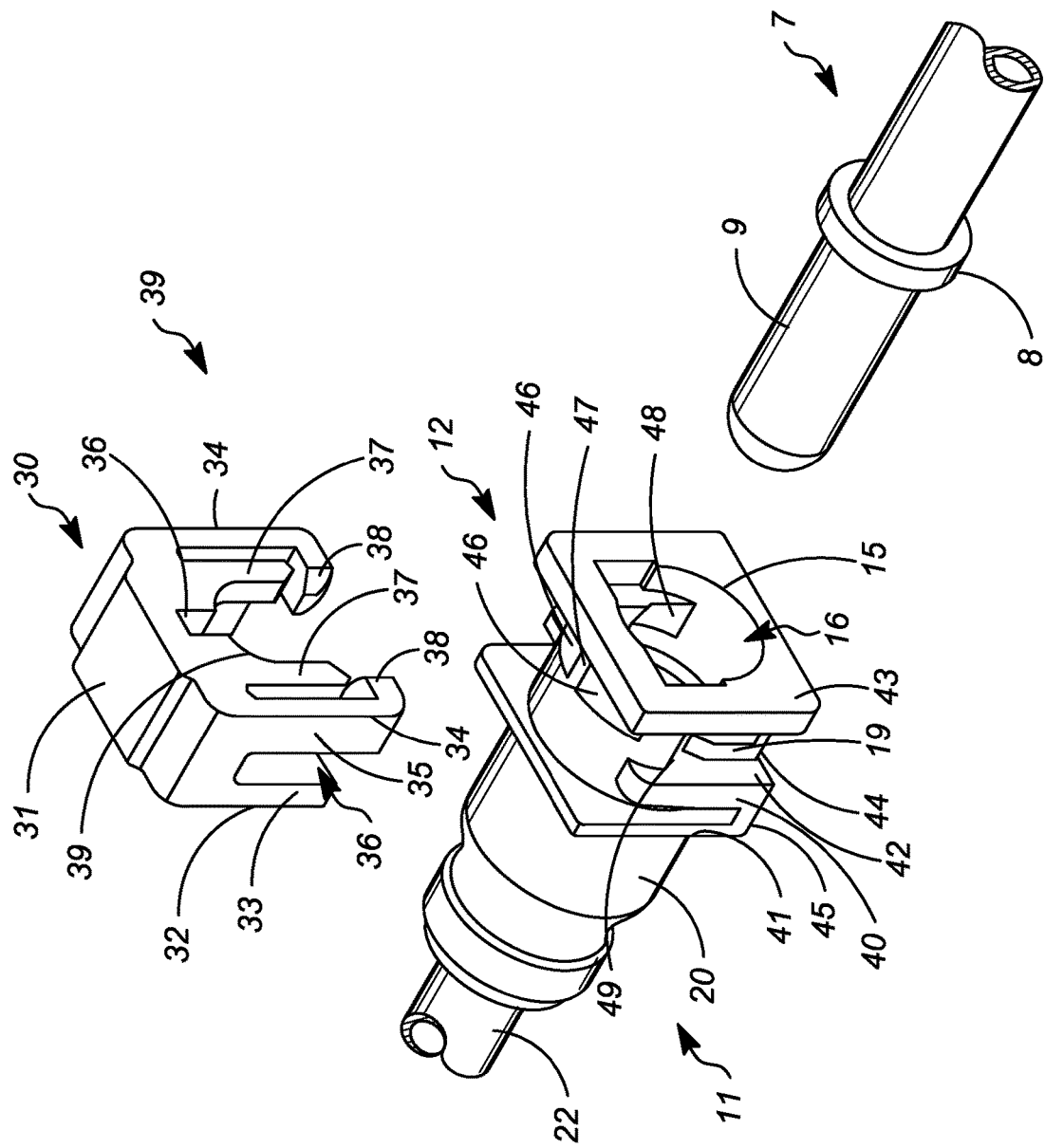
FIG. 1 is an exploded perspective view showing a quick connector in accordance to the present disclosure.

Turning now to FIG. 1, a quick connector assembly of the type used by the present disclosure is illustrated. The quick connector includes a connector body 11, a pipe 7 and a latch mechanism 30. The pipe 7 is arranged to be installed into connector body 11 and may be made of, for example, of metal or a plastic material, formed in a substantially round pipe shape. A flange portion 8 forms a bulge portion that projects annularly from the outer peripheral surface of pipe 7 spaced a predetermined distance from the frontal end portion 9 of the pipe 7. The pipe 7 may be an endform formed on an end of a pipe or could be, for example, a fitting that may be attached to pipe 7 by any convenient means, such as by soldering, laser welding or the like.

As shown in FIG. 1, the connector body 11 is made of, for example, a resin plastic and is formed in a substantially cylindrical shape. One end of the connector body 11 includes pipe receiving part 12 arranged to accept pipe 7 into an opening 15. The other end of the connector body 11, includes a coupling end 20 used to couple the connector body 11 to another device. The coupling end 20 may include a male stem 22 for mating with a receptacle of another device. The male stem 22 may also include one or more barbed flanges 24, shown at FIGS. 2 and 3 that can have a tube (not shown) made of, for example, a synthetic resin friction fitted onto the male stem 22 over flanges 24, thereby making a fluid coupling to connector body 11. Fluid from pipe 7 can pass from the pipe into an internal passage, partially shown by passage 16 in the connector body 11 and through the male stein 22 of the coupling end 20 and into tube or vice-versa.

An internal passage 16 is formed in the interior of connector body 11 that includes annular interior walls shaped to accept the frontal end portion 9 and pipe bulge 8 of the pipe 7. One or more O-rings (not shown) may be installed in the internal passage 16 to provide a liquid tight seal between the pipe 7 and connector body 11.

As shown in FIG. 1, first and third flanges members 41 and 43 are arranged on the outer peripheral surface of the pipe receiving part 12 in parallel to each other on either end of receiving part 12. Each of the first and third flange member 41 and 43 is formed in a substantially square shape having upper, lower, left and right side edges. A second flange member 42 is formed so as to expose the upper part of the pipe receiving part 12. A flat lower surface 44 extends between the second flange 42 and the third flange 43 horizontally along the tangential direction of the lower end surface. The flat lower surface 44 is slightly recessed from the lower edges of the first and second flange members 42 and 43.

A plate portion 45 extends horizontally in the left-right direction along the tangential direction of the lower end surface of the pipe receiving part 12 between first flange member 41 and second flange member 42. The left and right end portions of the lower plate portion 45 are flush with both side edges of both flange members 41 and 42.

A pair of left and right insertion holes 46 are located in a front half portion of pipe receiving part 12 between the third flange member 43 and the second flange member 42. As shown in FIG. 1, a pair of receiving holes 48 (only one shown in FIG. 1) correspond to the two insertion holes 46 and are formed symmetrically in the lower half of the pipe receiving part 12. Recesses 49 are formed in the upper half portions of both receiving holes 48, respectively.

As shown in FIG. 1, a latch member 30 made of metal or a resin plastic material has a top portion 31, left and right guide legs 32, left and right latching legs 34, and left and right tube retaining pieces 37. The top portion 31 is formed in a substantially flat plate shape and sized to fit between the first flange member 41 and the third flange member 43 so as to be fitted into the pipe receiving part 12 from above. The left and right guide legs 32 are formed in a long and narrow plate shape having a flat front surface 33 extending symmetrically and downward from both left and right ends of the rear half of the top portion 31. The two guide legs 32 are slidably engaged from above between the first flange member 41 and the second flange member 42 in the pipe receiving part 12. The left and right latching legs 34 are formed in left and right symmetrical shapes from the left and right ends of the front half of top portion 31, respectively, and are formed in elongated thin plate shapes having a flat front surface 35 extending downward from top portion 31. The two latching legs 34 are slidably engaged from the upper side to the lower side between the second flange member 42 and the third flange member 43 of the pipe receiving part 12. The second flange member 42, further includes a flat front face 40 positioned in the gap between the latching leg 34 and the guide leg 32.

Latching legs 34 are formed so as to be elastically deformable, that is, flexibly deformed in the direction in which the lower ends are expanded. As shown in FIG. 1, substantially square plate-shaped latch projections 38 are protruded from the lower ends of both latching legs 34 so as to face each other. The two latch projections 38 are engaged with the upper ends of the respective receiving holes 48 of the pipe receiving part 12 by utilizing the elastic deformation of the respective latching legs 34 so as to enter the recesses 48. In this state, the distal ends of the two latch projections 38 protrude into the pipe connection part 12 retaining latching member 30 to the pipe receiving part 12 in a "pipe insertion position".

When the retainer 30 is attached to the connector body 11 in the tube insertion position, the two latch projections 38 slide along the outer peripheral surface of the pipe connection part 11 while the two latching legs 34 are elastically deformed outward of the complementary outer peripheral surfaces of the pipe receiving part 12. The elastically deformed latching legs 34 are elastically restored by extending under concave portions 49 and into receiving holes 48, engaging the two latching projections 38 into both receiving holes 48. At this time, the up and down movement of the retainer 30 is restricted by the two latch projections 38 facing the upper and lower surfaces of the concave portion 49 of receiving holes 48.

As shown in FIG. 1, the left and right retaining pieces 37 are formed in a long thin symmetrical left and right plates shapes that extend downward from the front end of the top portion 31. A locking groove 39 is formed between the two retaining pieces 37 so as to form an inverted U shape and to receive the pipe 7 in the radial direction. Both retaining pieces 37 are inserted into the two insertion holes 26 of the pipe connection part 12 from above. When the retainer 30 is at the pipe insertion position, both retaining pieces 37 are only partially installed in insertion holes 26. An interruption slot 36 is formed between the upper ends of both retaining pieces 37. The interruption slot 36 is formed so as to be able to relatively receive a partition 47 located between the two insertion holes 26.

The quick connector of the present disclosure, as described above, is used as follows. With the latching member 30 in the pipe insertion position, the pipe 7 is inserted into the pipe receiving part 12 through opening 15. The tube 7 is inserted into the internal passage 16 until the flange 8 comes in contact with a front end face formed in the internal passage. The front end portion 9 extends into internal passage 16 within coupling end 20 (not shown). Rubber O-rings mounted within internal passage 16 contact an outer surface of the front end portion 9 of the pipe 7 and by utilizing elastic deformation, provides a liquid tight seal between pipe 7 and the connector body 11.

When the top portion 31 of the retainer 30 is pushed downward, the retainer 30 is disengaged from the tube insertion position. The latching projections 35 of the two latching legs 34 disengage from receiving holes 48 and slide down along the inclined surfaces 19 to descend and finally pass through the flat lower surface 44. Once beyond lower surface 44 latching legs 34 regain their relaxed positions. Any upward movement of the retainer 30 is prevented by the engagement of the two latching projections 35 against the bottom of flat lower surface 44. At the same time, the interrupt slot 36 of the retainer 30 engages with the partition 47 of the pipe receiving part 12. With slot 36 engaged against partition 47, downward movement of the retainer 30 stopped positioning the latch mechanism 30 is in its "latched position".

Figure 2:
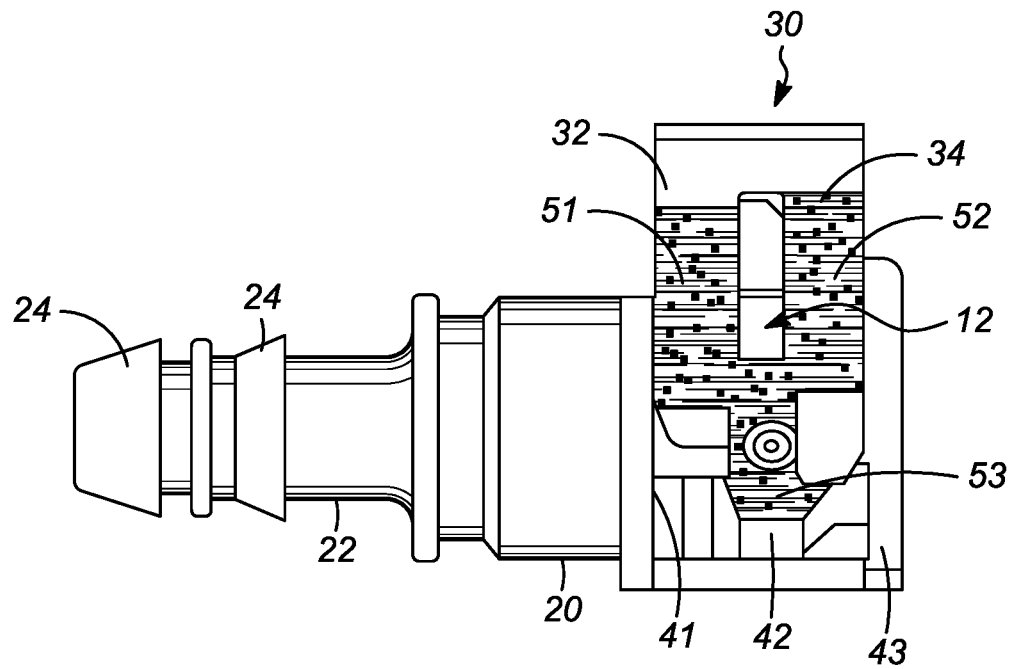
FIG. 2 is a side elevational view of a quick connecter having a latching mechanism in a pipe insertion position in accordance to a first embodiment of the present disclosure.
Figure 3:
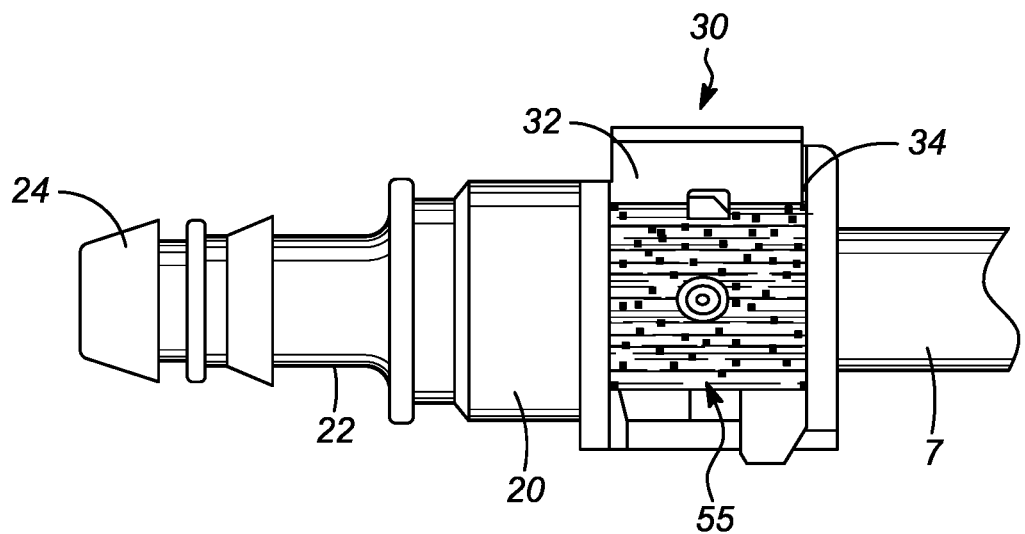
FIG. 3 is a side elevational view of the quick connector of FIG. 2 having the latching mechanism in a latched position in accordance to the first embodiment of the present disclosure.

Turning to FIGS. 2 and 3, a first embodiment of the present disclosure is illustrated. In FIG. 2 latch mechanism 30 is shown in the pipe insertion position. As is shown, guide legs 32 and latching legs 34 has a first partial portion of a scannable code 51 printed or etched on a planar external surface 33 of guide leg 32. A third partial portion of a scannable code 53 is printed or etched on planar external surface 35 of latching leg 34. A second partial portion of a scannable code 52 is printed on a planar external surface 40 of second flange member 42. The partial codes 51, 52 and 53 can be for example, barcodes, QR codes or any other code that can be scannable and read by a machine vision device, a handheld scanner or other code scanning device. With latch mechanism 30 in the pipe insertion position, the partial codes 51, 52 and 53 are mis-aligned and are unreadable by the scanner device as a complete code.

Moving the latch mechanism 30 into the latching position, as was explained above, captures pipe 7 and moves code portion 51 and 53 into an alignment with code portion 52. When the latching member 30 is fully installed into the latching position, code portions 51, 52 and 53 become aligned to build a complete scannable code 55 that can represent a latched connector. As is shown in FIG. 3, the completed scannable code 55 represents a positive latch connection between the pipe 7 and the connector body 11. The completed scannable code 55 can be read and recorded by a user using the handheld scanner, either during the installation of the quick connector in the field or during a manufacturing process. Even though the present embodiment has been explained using three partial codes 51, 52 and 53 to build a final readable scannable code 55, the same outcome can be made using any other combination of movable and fixed code portions. For example, only one leg of the latching mechanism 30 may contain a code portion that when moved into a latched position aligns with a fixed code portion to build the scannable code representing a latched connector.

Figure 4:
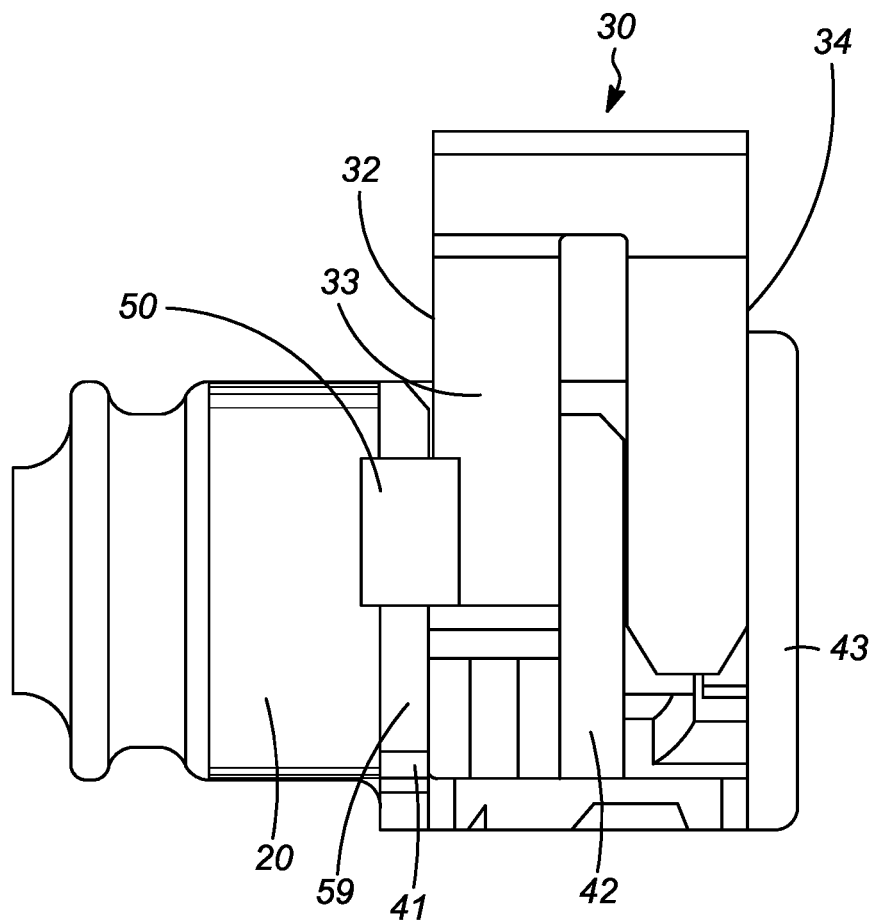
FIG. 4 is a side elevational view showing a quick connector having a latching mechanism in a pipe insertion position in accordance to a second embodiment of the present disclosure.
Figure 5:
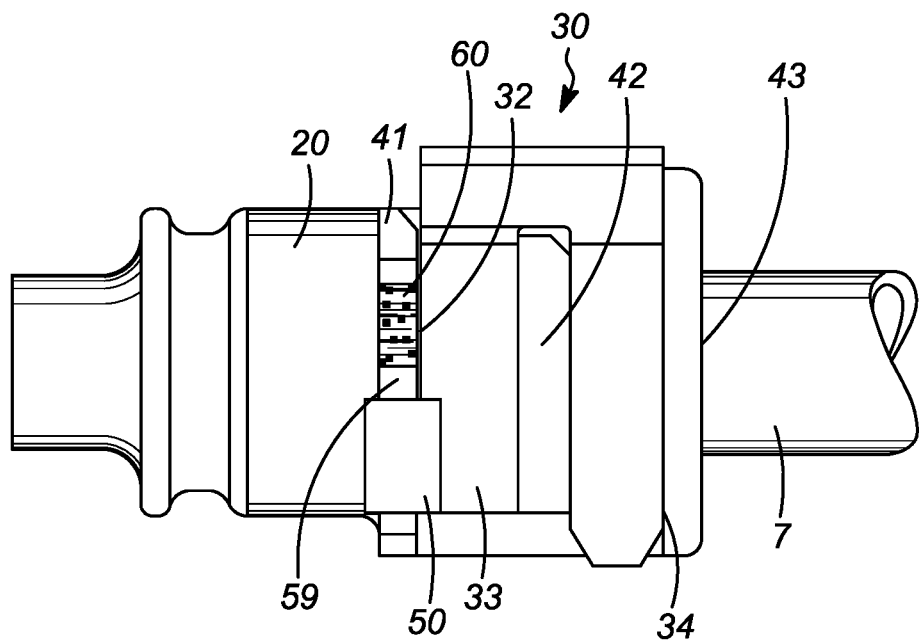
FIG. 5 is a side elevational view showing the quick connector of FIG. 3 having the latching mechanism in a latched position in accordance to the second embodiment of the present disclosure.

Turning now to FIGS. 4 and 5 a second embodiment of the present disclosure is illustrated. In FIG. 4 latch mechanism 30 is shown in the pipe insertion position. The latch mechanism 30 guide leg 32 includes a cover member 50 extending perpendicularly from guide leg 32. The cover member 50 is formed as a planar plate fixed to and extending from surface 33 of guide leg 32. Cover 50 is attached near the bottom portion of guide leg 32 and is arranged to extend over an edge surface 59 of the first flange member 41. The cover 50 is arranged to move with guide leg 32 when latch mechanism 30 is moved from the pipe insertion position to the latched position. A scannable code 60 is printed or etched on edge surface 59 at a first portion of the first flange member 41 as is best seen at FIG. 5. The scannable code 60 may be, for example, a barcode, a QR code or other machine readable code that is printed or etched on edge surface 59 of flange member 41 and that can be scanned and read by a machine vision device, a handheld scanner or other code scanning device.

As illustrated in FIG. 4, the latch mechanism 30 in the pipe insertion position, is ready to accept a pipe 7 in accordance to the previous disclosure explained for FIG. 1 above. In this second embodiment, when the latch mechanism is in the pipe insertion position, the cover 50 is positioned over scannable code 60 covering the scannable code 60 and rendering the code unreadable.

Moving the latch mechanism 30 into the latch position slides the guide leg 32 and cover 50 downward. When the latch mechanism enters into the latched position, cover 50 is moved to a second portion of edge surface 59 of flange member 41 shown in FIG. 5, the scannable code 60 is uncovered and can now be read and recorded by a user using the handheld scanner, either during the installation of the quick connector in the field or during a manufacturing process.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism." "module." "device," "unit," "component," "element," "member," "apparatus," "machine," or system within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A connector comprising:
a connector body having a receiving portion and at least one flange surrounding an internal passage, the at least one flange having an external surface and the internal passage arranged to receive a pipe therein;
a latch member having at least a first leg and an external surface retained on the receiving portion adjacent the flange, the latch member movable between a pipe insertion position and a latched position, wherein in the pipe insertion position the pipe is inserted into the internal passage; and
at least a first partial scannable code applied to the first leg external surface and at least one additional partial scannable code applied to the external surface of the flange,
wherein the latch member is moved to the latched position retaining the pipe to the connector body and aligning the first partial scannable code with the at least one additional partial scannable code, forming a readable code representing the latched position.

2. The connector of claim 1 wherein, the connector body includes first, second and third flanges the first and third flanges defining the connector receiving portion, and the second flange defining the at least one flange.

3. The connector of claim 2 wherein, the latch member includes at least one additional leg positioned in spaced relationship from and parallel to the first leg, the first leg and the at least one additional leg positioned between the first and third flanges with the second flange interposed between the first leg and the at least one additional leg.

4. The connector of claim 3 wherein, the latch member additional leg includes an external surface and a third partial scannable code is applied to the external surface of the latch member additional leg.

5. The connector of claim 4 wherein, in the pipe insertion position the first, second and third partial scannable codes are mis-aligned and unreadable.

6. The connector of claim 5 wherein, the first, second and third partial scannable codes are a machine readable QR code.

7. The connector of claim 5 wherein, the first, second and third partial scannable codes are a machine readable barcode.

8. The connector of claim 4 wherein, in the latched position, the first second and third partial scannable codes are aligned and assemble the readable code representing the latched position.

9. The connector of claim 8 wherein the readable code representing the latched position is machine readable using a scanning device.

10. A connector comprising:
a connector body having a receiving portion including first, second and third flanges surrounding an internal passage, the internal passage arranged to receive a pipe therein;
a latch member having at least a first leg retained on the receiving portion adjacent the first flange, the first leg including a cover member extending from the first leg over the first flange, a second leg positioned in spaced relationship from and parallel to the first leg, the first and second legs located between the first and third flanges with the second flange interposed between the first leg and second leg and the latch member movable between a pipe insertion position and a latched position, wherein in the pipe insertion position the pipe is inserted into the internal passage; and
a scannable code applied to the flange and hidden by the cover in the pipe insertion position,
wherein the latch member is moved to the latched position retaining the pipe to the connector body and moving the cover member to uncover a scannable code representing the latched position.

11. The connector of claim 10 wherein, the first flange includes a planar edge surface having the scannable code applied to a first portion of the edge surface, wherein the cover member travels along the first flange edge surface from the first portion to a second portion when the latch member is moved from the pipe insertion position to the latched position.

12. The connector of claim 11 wherein, in the latched position, the cover is in the second portion uncovering the scannable code representing the latched position.

13. The connector of claim 10 wherein, the scannable code is a machine readable QR code.

14. The connector of claim 10 wherein, the scannable code is a machine readable barcode.

15. The connector of claim 10 wherein, the scannable code representing the latched position is machine readable using a scanning device.

16. A method for verifying a latched connection of a connector, the method comprising:
providing a connector body having a receiving portion including first, second and third flanges surrounding an internal passage the internal passage arranged to receive a pipe therein;
providing a latch member retained on the receiving portion, the latch member having a first leg and a second leg positioned in spaced relationship from and parallel to each other, the first and second leg s located between the first and third flanges with the second flange interposed between the first leg and second leg, the latch member movable between a pipe insertion position and a latched position, wherein in the pipe insertion position the pipe is inserted into the internal passage; and
moving the latch member to the latched position retaining the pipe to the connector wherein a scannable code becomes readable verifying the latched position.

17. The method of claim 16, the method further includes:
providing a scanning device for reading the scannable code,
wherein in the pipe insertion position the scannable code is unreadable by the scanning device and in the latched position the scannable code is readable by the scanning device.

18. The method of claim 17, wherein the scannable code is a QR code.

19. The method of claim 17, wherein, the scannable code is a barcode.

\* \* \* \* \*